United States Patent [19]

Takada et al.

[11] 4,343,825

[45] Aug. 10, 1982

[54] PROCESS FOR THE PREPARATION OF AN AEROSOL TYPE WHIPPING CREAM

[75] Inventors: Moritaka Takada, Yokohama; Hiroshi Kanda, Zushi, both of Japan

[73] Assignee: Nisshin Oil Mills Ltd., Tokyo, Japan

[21] Appl. No.: 187,035

[22] Filed: Sep. 15, 1980

[30] Foreign Application Priority Data

Sep. 14, 1979 [JP] Japan ............................. 54-117407

[51] Int. Cl.³ .................. A23L 1/19; B65D 85/72; B65D 83/14
[52] U.S. Cl. ............................ 426/570; 426/116; 426/602; 426/604; 426/394
[58] Field of Search ............... 426/570, 116, 602, 604, 426/394

[56] References Cited

U.S. PATENT DOCUMENTS

| | | | |
|---|---|---|---|
| 2,407,027 | 9/1946 | Mason | 426/570 |
| 2,489,173 | 11/1949 | Burnett et al. | 426/570 |
| 2,489,208 | 11/1949 | Turner | 426/570 |
| 2,619,422 | 11/1952 | Diamond | 426/654 |
| 2,619,423 | 11/1952 | Diamond | 426/570 |
| 2,846,314 | 8/1958 | Aichele et al. | 426/570 |
| 2,883,286 | 4/1959 | Musser | 426/116 |
| 2,929,715 | 3/1960 | Sutton | 426/570 |
| 3,210,198 | 10/1965 | Keller | 426/570 |
| 3,230,091 | 1/1966 | Thompson | 426/570 |
| 3,431,117 | 3/1969 | Lorant | 426/654 |

OTHER PUBLICATIONS

Pressurized Packaging, Herzka et al., 2nd Ed. Butterworths 1961, pp. 76-81, 182-184.
Processed Plant Protein Foodstuffs, Altschul, Academic Press, 1958, pp. 400-409.
Soybeans & Soybean Products, Markley, vol. II, Interscience Publ. 1951, pp. 978-989.
Soybeans: Chemistry & Technology, Smith & Circle, vol. I, Avi Publ., 1972, pp. 326-333, 356-361, 370-373.
Science & Technology of Aerosol Packaging, Sciarra et al., Wiley & Sons, 1974, pp. 137-140, 434, 435.
Aerosols: Science & Technology, Shepherd, Interscience 1961, pp. 32-34, 409-428.

*Primary Examiner*—Steven L. Weinstein
*Attorney, Agent, or Firm*—Sughrue, Mion, Zinn, Macpeak & Seas

[57] ABSTRACT

A whipping cream is obtained using a partially enzymolyzed soybean protein, with which an aerosol container is filled up and $CO_2$ gas as a propellant is charged under pressure into the container. When the partially enzymolyzed soybean protein is used in amounts of 1-6% by weight based on the cream, the whipping cream exhibits good emulsification state and has moderate overrun and a shape-maintaining property when extruded with $CO_2$ gas.

2 Claims, No Drawings

PROCESS FOR THE PREPARATION OF AN AEROSOL TYPE WHIPPING CREAM

BACKGROUND OF THE INVENTION

This invention relates to a process for the preparation of an aerosol type whipping cream with use of $CO_2$ gas.

In Europe and America, using nitrous oxide or Freon (the tradename by E. I. du Pont) as a whipping agent or propellant, the aerosol type whipping creams are obtained with a good flavor, organoleptic properties and shape-maintaining property.

On the other hand, in Japan the use of these gases in foods is not admitted and gases to be used are limited to $CO_2$ gas and nitrogen gas. However, the use of $CO_2$ gas as the whipping agent encounters various difficulties as disclosed in Japanese Patent Publication No. 47-34141. As a result of $CO_2$ gas dissolving in a sweetened cream the emulsion becomes unstable so that a coagulation or separation of the oil and fat used takes place during the preparation or preservation of products and therefore, good whipping cannot be obtained.

Thus, for overcoming the unstability of the emulsion a self-emulsifying monoglyceride is used for an emulsifier as described in the above Japanese Patent Publication. This self-emulsifying monoglyceride, however, is not suitable for use in foods because of containing potassium or magnesium salts of fatty acids.

For preparing the whipping sweetened cream, solid milk such as a powdered skim milk, fatty acid esters and lecithin are used as the emulsifier or soybean protein is used instead of the solid milk (e.g. Japanese Patent Kokais Nos. 51-70850, 53-98310 and 53-145959).

Sweetened creams using such a solid milk or soybean protein (e.g. an extracted soybean protein or isolated soybean protein) have a good whipping property and shape-maintaining property when whipped with stirring by hand or by machinery.

However, when the whipping cream is charged into an aerosol container and $CO_2$ gas is fed under pressure and dissolved therein, a good whipping cream cannot be obtained for the reasons that the cream is as a whole too coagulative to be extruded from the container, separation of the oil and fat takes place, and that the cream has rough organoleptic properties.

SUMMARY OF THE INVENTION

An object of this invention is to provide a whipping cream of an aerosol type using $CO_2$ gas, having a very stable emulsification state and exhibiting a moderate overrun and shape-maintaining property when extruded from the aerosol container.

In accordance with this invention there is provided a process for the preparation of an aerosol type whipping cream which comprises homogenizing an aqueous phase containing a partially enzymolyzed soybean protein of 1-6% by weight based on the composition of cream with an oily phase containing an edible oil and fat and an edible emulsifier, charging the resulting emulsified composition to an aerosol container and introducing under pressure $CO_2$ gas and if desired, nitrogen gas therein.

DETAILED DESCRIPTION OF THE INVENTION

In this invention a hydrolysis degree of the partially enzymolyzed soybean protein is indicated by a weight percentage of protein dissolving in a 10% aqueous solution of trichloroacetic acid to the total of soybean protein (hereinafter referred to as "10% TCA solubilization rate").

According to a preferred embodiment of this invention, with use of the soybean protein having a 10% TCA solubilization rate of 20-90% by weight, a sweetened emulsified oil and fat composition (herein referred to merely as "cream") has good stability of emulsification in the form of an aerosol type which is filled up with $CO_2$ gas and therefore, a good whipping cream is obtained.

If the solubilization rate is less than 20%, the emulsification stability is reduced and coagulation occurs as observed in the cream using conventional soybean proteins. On the other hand, with the solubilization rate of more than 90% the effect of emulsification is reduced and thus, the emulsification state becomes worse.

The amount of the partially enzymolyzed soybean protein may vary depending on the amount and properties of the oil and fat to be used, though the range of 1-6% by weight based on the cream is preferred. With the amount of less than 1% by weight, the effect of emulsification is lowered so that a good whipping cream is not obtained.

On the other hand, when the amount exceeds 6%, the resulting cream is lacking in flowability and solidifies so that it is unsuitable in the whipping use.

The aqueous phase containing the partially enzymolyzed soybean protein may, if desired, include phosphoric acid salts or polyphosphoric acid salts for the purpose of stabilization of emulsification and also, a soluble starch, natural or synthetic gums and pastes for the purpose of improving the whipping shape-maintaining property.

Next, the oil and fat which may be used in the oily phase are, preferably those having a m.p. of 25°-45° C. and the examples are an animal and vegetable oil and fat, hydrogenated oils thereof, fractionated oils, interesterified oil and others.

It is necessary for the oily phase to have a oil-soluble edible emulsifier such as lecithin, sugar fatty acid esters, sorbitan fatty acid esters and glycerin fatty acid esters dissolved therein.

Natural or synthetic fruit flavors, souring agents, sweetening agents, milk flavors, chocolate, cocoa, fruit juice and others may be added to prepare a whipping cream with sweetened, various tastes.

By way of example for preparing the cream, an oil and fat having a m.p. of 25°-45° C. is heated above 60° C. and an edible emulsifier such as lecithin, sugar fatty acid esters, sorbitan fatty acid esters and glycerin fatty acid esters are dissolved in appropriate amounts therein to form an oily phase.

On the other hand, the partially hydrolyzed soybean protein in an amount of 1-6% based on the cream and sugar or honey and if desired, polyphosphoric acid salt, a soluble starch and pastes are dissolved in water and sterilized by heating to form an aqueous phase. Since the aqueous phase has many fungi, the heat sterilization is preferred.

The oily phase is mixed with the aqueous phase while maintaining the temperature at 60° C. or more and homogenized under high pressures by a homogenizer in conventional methods. After cooling to room temperature, the resulting cream is charged to an aerosol container and then, $CO_2$ gas and if necessary, nitrogen gas are charged under pressure in accordance with known method.

The oil and fat content of the cream is, preferably between 20 and 50% by weight.

The container thus obtained is sterilized again at temperatures of more than 80° C., cooled rapidly and stored in a refrigerator at 5°–10° C.

In the preparation of the partially hydrolyzed soybean protein, the enzyme reaction conditions of pH, an amount of enzyme, temperature and time may vary depending on the type of enzyme. As for the enzyme proteinases may be all used, provided that the partially hydrolyzed soybean protein with a 10% TCA solubilization rate of 20–90% is obtained by the proteinase.

Soybean proteins with a 10% TCA solubilization rate indicated in Table 1, which are used in Examples, are obtained as follows:

A 10% aqueous solution of soybean protein was treated with an alkaline proteinase (Bioprase, the tradename by Nagase Sangyo, Japan, 20,000 U) at a pH of 8.0 and 60° C. for two hours, varying the ratio to protein as set forth in Table 1.

Thereafter the enzyme was inactivated by heating at 125° C. for four seconds and then, the end product of soybean protein is obtained by spray drying.

TABLE 1

| Ratios of Bioprase to Protein, W/W % | 0.15 | 0.3 | 0.5 | 0.9 | 1.2 |
|---|---|---|---|---|---|
| 10% TCA Solubilization Rate, % | 15 | 30 | 45 | 80 | 95 |

EXAMPLE 1

160 g of a hydrogenated soybean oil of 42° C. in m.p., 160 g of hydrogenated rapeseed oil of 34° C. in m.p. and 80 g of a hydrogenated palm oil of 30° C. in m.p. were mixed and dissolved at 70° C. To the mixed oil were added 7.2 g of lecithin, 0.9 g of oleic monoglyceride, 0.9 g of stearic monoglyceride and 4.5 g of sorbitan monostearate and dissolved therein to form an oily phase.

On the other hand, 27 g of a partially hydrolyzed soybean protein having a 10% TCA solubilization rate of 45%, 0.9 g of sodium hexametaphosphate, 9 g of water-soluble starch and 100 g of cane sugar were dissolved in 454 ml of water, sterilized by heating at 95° C. for 20 minutes and cooled to 70° C. to form an aqueous phase.

The oily phase and aqueous phase thus obtained were mixed at 70° C., stirred and then homogenized under pressure of 60 Kg/cm$^2$ by a homogenizer to form a cream.

The cream obtained was cooled to room temperature, 200 g of which were charged to an aerosol can of 360 ml in capacity and 3 g of $CO_2$ gas was charged under pressure thereto.

Then, the aerosol can was sterilized by heating at 90° C. for 20 minutes, cooled by ice water and stored in a refrigerator at 5° C. overnight.

For comparison, aerosol cans filled with cream were obtained in the same manner as in Example 1 except using a partially hydrolyzed soybean protein having a 10% TCA solubilization rate of 15% (Comparative Example 1) and of 95% (Comparative Example 2).

The properties of products of Example 1 and Comparative Examples 1 and 2 were observed. The product of Example 1 was remarkably superior to those of Comparative Examples as shown in Table 2.

TABLE 2

| Run No. | Emulsification State of Cream (*) | State of Whipping |
|---|---|---|
| Ex. 1 | Good | Good whipping; 170% overrun, good shape-maintaining property |
| Comp. Ex. 1 | Coagulative | Unextrudable because of blocking up of nozzle |
| Comp. Ex. 2 | Relatively poor | 70% overrun, poor shape-maintaining property, soft ice cream-shaped |

(*) The cream in which $CO_2$ gas is charged under pressure

EXAMPLE 2

120 g of a fractionated and hydrogenated palm oil having a m.p. of 36° C., 120 g of lard and 100 g of hydrogenated palm oil having a m.p. of 34° C. were mixed and dissolved at 65° C. To the mixed oil were added 6.5 g of lecithin, 0.7 g of oleic monoglyceride, 0.7 g of stearic monoglyceride and 4.0 g of sorbitan monostearate and dissolved therein to form an oily phase.

On the other hand, 15 g of a partially hydrolyzed soybean protein of 30% in 10% TCA solubilization rate, 0.9 g of sodium hexametaphosphate, 9.0 g of a water-soluble starch and 100 g of cane sugar were dissolved in 523 ml of water, sterilized by heating at 110° C. for 5 minutes and cooled to 65° C. to form an aqueous phase.

The oily phase and aqueous phase obtained were mixed at 65° C., stirred and then homogenized under pressure of 80 Kg/cm$^2$ by a homogenizer to form a cream.

The cream thus obtained was cooled to room temperature, 200 g of which were charged to a 360 ml of aerosol can and 3 g of $CO_2$ gas were introduced under pressure thereto. Then the aerosol can was sterilized by heating at 90° C. for 20 minutes, cooled by ice water and stored in a refrigerator at 5° C. overnight.

EXAMPLE 3

A cream filled up aerosol can was obtained in the same manner as in Example 2 except using 50 g of a partially hydrolyzed soybean protein of 80% in 10% TCA solubilization rate and 488 ml of water.

Comparative Example 3

A cream filled up aerosol can was obtained in the same manner as in Example 2 except using 5 g of a partially hydrolyzed soybean protein of 30% in 10% TCA solubilization rate and 533 ml of water.

Comparative Example 4

A cream filled up aerosol can was obtained in the same manner as in Example 3 except using 70 g of a partially hydrolyzed soybean protein of 80% in 10% TCA solubilization rate and 468 ml of water.

The results of Examples 2 and 3 and Comparative Examples 3 and 4 are set forth in Table 3.

TABLE 3

| Run No. | Amount of Partially Hydrolyzed Soybean Protein, % | Emulsification State of Products | State of Whipping |
|---|---|---|---|
| Ex. 2 | 1.5 | Good | Good; 165% overrun, good shape-maintaining property |
| Ex. 3 | 5.0 | Good | Good; 170% overrun, good shape-maintaining |

TABLE 3-continued

| Run No. | Amount of Partially Hydrolyzed Soybean Protein, % | Emulsification State of Products | State of Whipping |
|---|---|---|---|
| Comp. Ex. 3 | 0.5 | Oil off during homogenization step | property Poor; oil off |
| Comp. Ex. 4 | 7.0 | Viscosity rising suddenly during homogenization step | Solidified in the can, unextrudable |

As is apparent from Table 3, when the amount of the partially hydrolyzed soybean protein is outside the range defined in this invention, the state of whipping is poor.

What is claimed is:

1. A process for the preparation of an aerosol type whipping cream which comprises homogenizing an aqueous phase containing a partially enzymolyzed soybean protein of 1-6% by weight based on the composition of cream with an oil phase containing an edible oil and fat and an edible emulsifier, charging the resulting emulsified composition to an aerosol container and charging under pressure a gas consisting of $CO_2$ in an amount sufficient by itself to function as the whipping agent and propellant, wherein said partially enzymolyzed soybean protein has such a hydrolysis degree that a weight ratio of protein dissolving in a 10% aqueous solution of trichloroacetic acid to the total of soybean protein is within the range of 20-90%.

2. The process of claim 1 wherein said edible oil and fat have a melting point of 25°-45° C.

* * * * *